United States Patent [19]
Luotsinen et al.

[11] Patent Number: 5,359,877
[45] Date of Patent: Nov. 1, 1994

[54] METHOD OF DEFINING AN OPERATING AND A RESET POINT FOR A LIMIT VALUE DEVICE

[75] Inventors: Osmo Luotsinen; Marko Stenbacka, both of Pietarsaari, Finland

[73] Assignee: Oy Beamex AB, Pietarsaari, Finland

[21] Appl. No.: 837,211

[22] Filed: Feb. 18, 1992

[30] Foreign Application Priority Data

Mar. 8, 1991 [FI] Finland ................ 911173

[51] Int. Cl.⁵ .............................. G01L 27/00
[52] U.S. Cl. ..................... 73/1 R; 73/4 R; 324/415
[58] Field of Search ........... 73/1 R, 4 R; 324/415, 324/423, 424

[56] References Cited

U.S. PATENT DOCUMENTS 4,854,165  8/1989  Jay ....................... 324/415
5,117,189  5/1992  Terminiello et al. ......... 324/423

FOREIGN PATENT DOCUMENTS 81657      11/1990  Finland .
3835677A1  4/1990   Germany .
292080     11/1988  Japan ..................... 324/423
266070     3/1970   U.S.S.R. ................. 324/415

Primary Examiner—Hezron E. Williams
Assistant Examiner—Nashmiya Ashraf
Attorney, Agent, or Firm—Fitch, Even, Tabin & Flannery

[57] ABSTRACT

A method of using calibration instrumentation for determining the operating and reset points for a device having an input and an output. An initial courts test is conducted with a first variable input to establish value areas wherein device state changes occur. The method is suited for calibration testing of industrial instrumentation and is effective when operating and reset points need to be accurately searched over a wide range while minimizing the time required for testing.

4 Claims, 2 Drawing Sheets

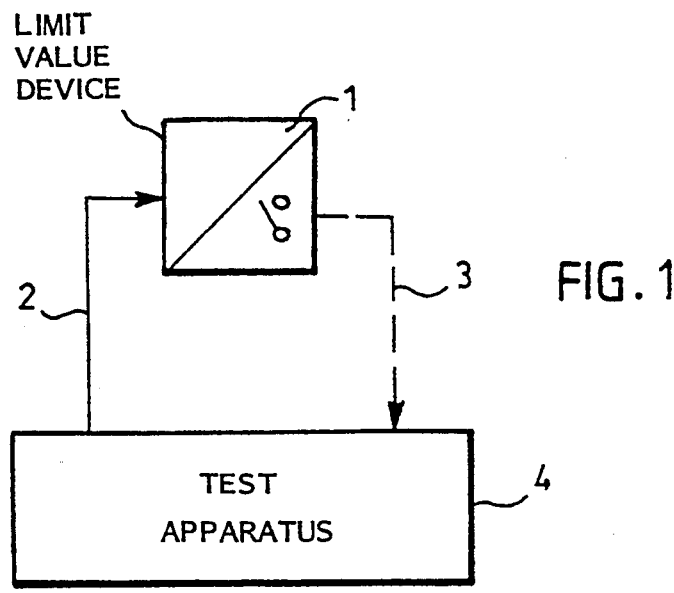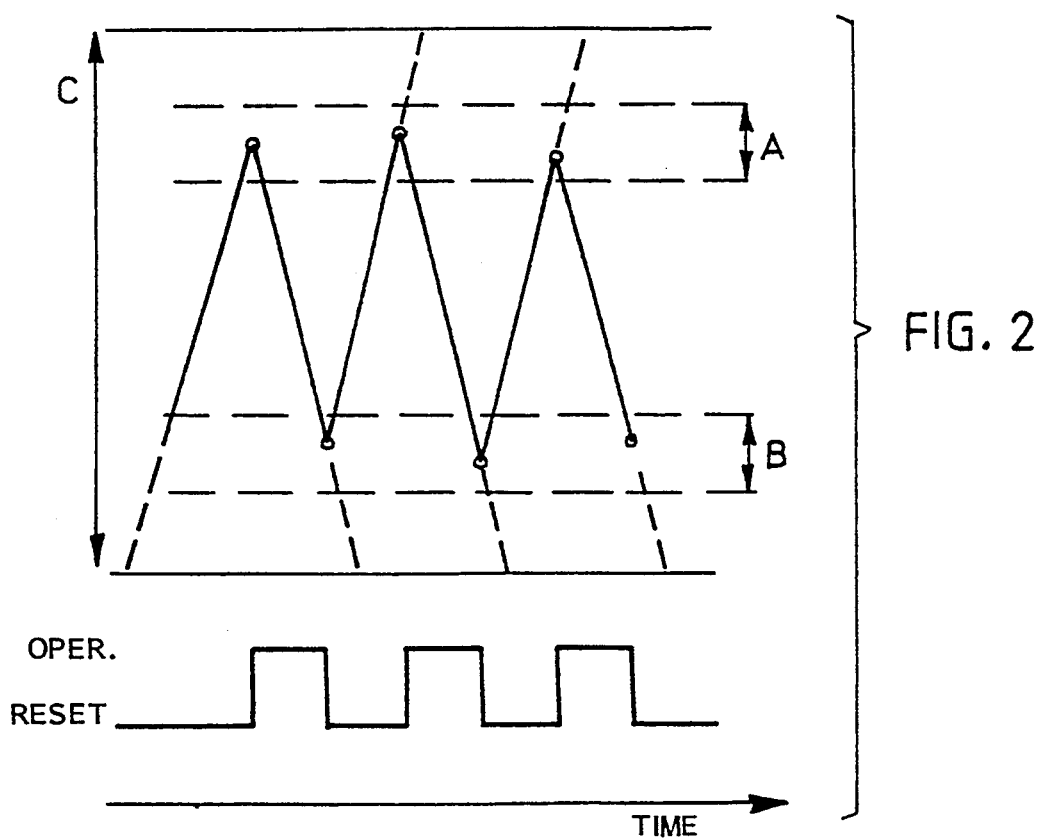

METHOD OF DEFINING AN OPERATING AND A RESET POINT FOR A LIMIT VALUE DEVICE

BACKGROUND OF THE INVENTION

The present invention relates to the determination of input signal thresholds for devices and more particularly to a method of using calibration instrumentation for determining the operating and the reset points for a limit value device.

This invention relates to a method of determining an operating and a reset point for a limit value device, the device having an input and an output, the output having two (2) states (operating and reset) and the input having threshold points associated therewith for triggering output state changes via an input signal presented at the input of the device. Such devices are sometimes referred to as limit value devices. The exact input values of the operating and reset characteristics and values are not known with certainty prior to using the method with calibration instrumentation to determine the operating and reset points more precisely. The method utilizes variable input signals which are supplied to the limit value device, when the limit value device changes state (operate-to-reset or reset-to-operate) both the value of the input signal and the direction of the change of state are detected.

A procedure as described above is known from Finnish Published Specification 81657, in which the limit value device is a pressure switch. The calibration instrumentation employing the principle of defining an operating and a reset point for a limit value device, known also from this publication, is illustrated by means of a block diagram, shown in an enclosed FIG. 1 and referred to in the following. A limit value device 1 is a device the output of which consists of a switch function or a logic ON/OFF function. Input 2 is some physical quantity, such as voltage, current, resistance, frequency, pressure or temperature. When the input exceeds a certain limit, output 3 changes its state, and when the input falls below some other limit, the output 3 resets to its original state. Between the operating point and the reset point, there is usually hysteresis. With some devices, the recurrence (retriggering) of the operating point and the reset point can be relatively hard to determine.

The purpose of checking a limit value device is to find out at which point the device operates and at which point it resets. If the repeatability of the operate and reset states of the device is bad or hard to predict, it is possibly desired that the testing be repeated several times. If the device does not operate satisfactorily, it may be required that its operating and reset points be adjusted or tuned and the test is repeated after that.

SUMMARY OF THE INVENTION

The object of the present invention is to set forth a method by means of which the time used for a test can be minimized and/or the accuracy to be achieved within a certain time can be improved compared with the conventional methods in the field.

These objects according to the invention can be obtained by means of the method of the invention. The method is characterized by supplying two variable input signals, one each during two stages of testing or calibration. In the first stage, the input signal has a slope (e.g., a triangle wave form) and thus changes at a rapid rate, for a gross determination not allowing an accurate determination of the input signal at the moment of a change of state, in order to define the areas (operate and reset) within which the changes of state occur. In the second stage of the input signal is changed within the operate and reset areas defined in the first stage at a slower or even stepwise rate (e.g., staircase function) enabling a definition of the accurate value of the input signal at the moment of the change of state.

When the input signal is a slowly variable quantity, such as pressure or temperature, it would be preferable to have the first stage of the input signal supply the input signal change within a preset range of variation. It is then possible to have the input signal change over the whole breadth of the preset range of variation or each time only up to the registration of the change of state.

When the input signal is a rapidly variable quantity, such as voltage, current, resistance or frequency, it would be preferable to have the first stage of the input signal supply the input signal is change in an alternating fashion from extreme to extreme over the entire range of a preset range of variation, reducing the range of variation stepwise, until steps are found within which the changes of state occur reliably, in order to define the operate and reset areas to be used in the second phase.

BRIEF DESCRIPTION OF THE DRAWINGS

The method of the invention is described in greater detail below, referring to drawings enclosed, in which FIG. 1 shows the general principle of testing a limit value device as block diagram, FIG. 2 shows a realization of a first, i.e. a preliminary testing phase of the method of the invention in case of slowly variable input signals.

DETAILED DESCRIPTION OF THE PREFERRED EMBODIMENTS

FIG. 2 illustrates a realization of the method of the invention when an input signal is a slowly variable quantity, such as pressure or temperature. In this preliminary testing phase (first stage) according to FIG. 2 the first input signal sweeps over the entire range of a preset scan area C. This first input signal has slope and varies at a rate too high for a final testing, but making it possible to find approximative values (gross estimates) for an operating and a reset point areas (e.g., areas denoted by regions A and B in FIG. 2). If the repeatability of operate and reset points is poor, the preliminary test can be repeated several times, as illustrated in FIG. 2. On the basis of the preliminary test, scan areas A and B to be used in a final test (second stage) are defined separately for the operating point and the reset point, respectively. Both in the preliminary test and the final test, the scanning can either be stopped after the operating/reset point has been found or continued until the edge of the area.

Figure 3:
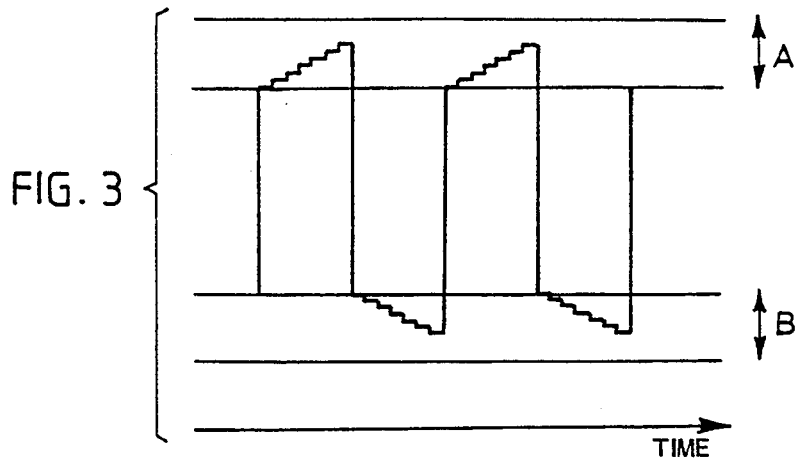
FIG. 3 shows the principle of a second, i.e. a final testing phase of the method of the invention.

After the scan areas A and B have been found in the preliminary test for the operating point and the reset point, respectively, the final test can be carried out according to FIG. 3. In this final test, a considerably lower rate of change or smaller steps of change can be used for the input signal to obtain a better accuracy. The time needed for the final test remains reasonable, however, because the area to be scanned is smaller. On the whole, it can be stated that the total time required for both the preliminary test and the final test remains practically less than if the whole scan area reserved for the preliminary test were scanned by using a low rate of change of the input signal. Thus, the time required for the whole test gets shorter and/or more accurate values are obtained for the operating/reset point within the time at disposal thanks to the low rate of change of the input signal used in the final test.

Figure 4:
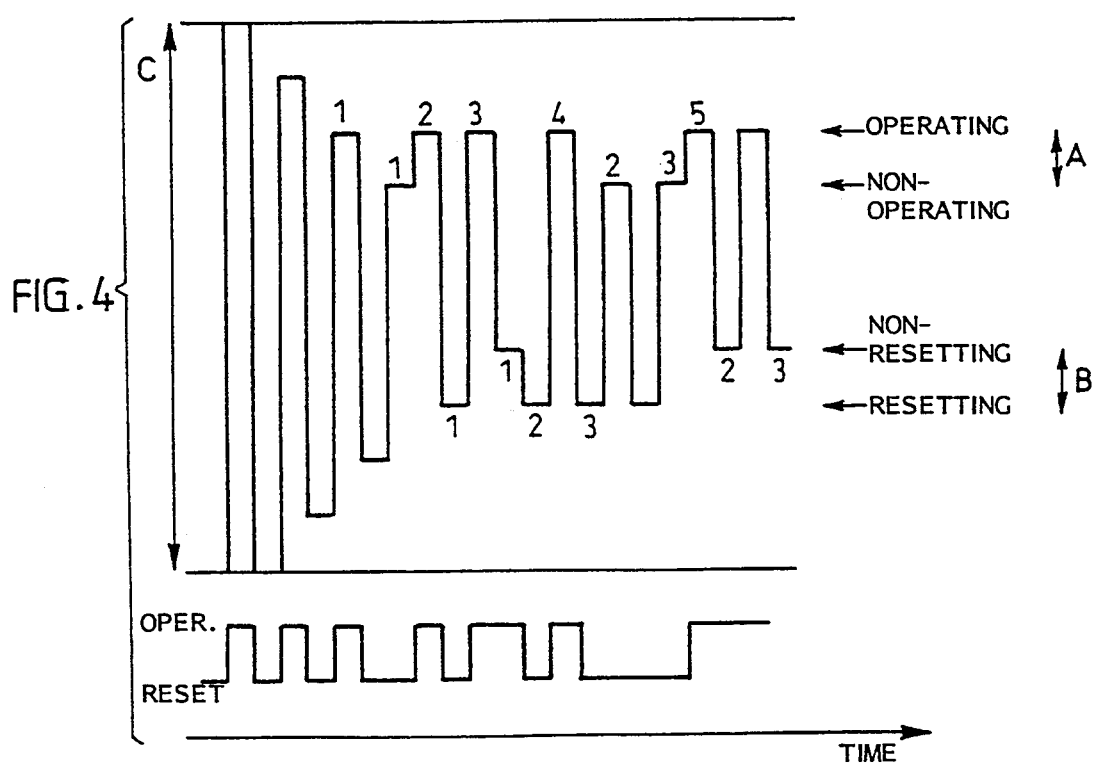
FIG. 4 shows the first, i.e. the preliminary testing phase of the method of the invention, the input signal being a rapidly variable quantity.

FIG. 4 describes the method according to an alternative embodiment of the invention when the input signal is a rapidly variable quantity, such as voltage, current, resistance or frequency. According to FIG. 4, the procedure in connection with such input signals in the preliminary test is that the input signal sweeps over the whole breadth of a preset range of variation, reducing the range of variation stepwise, until steps are found within which the changes of state occur reliably so that the scan areas A and B to be used in the final test can be obtained. In practice, this is realized in such a way that the input is changed repeatedly to and fro, beginning from a preset scan area C, but reducing the area until four points marking the edges of scan areas A and B are found at which the device operates and resets reliably. After that, such points are searched for in the vicinity of the operating and reset points at which the device does not yet operate or reset, however. The reliability of said four points can be secured, if necessary, by testing the operation at these points several times, as shown in FIG. 4. Several different methods can be used at the search of these four points; for instance, the points can be changed a certain amount at a time (e.g. 10% of the preset scan area). If this procedure gets too slow on account of the accuracy desired, it is possible to use bigger steps at the beginning and to reduce the step size at the end, when the operating/reset point is already roughly known. One more possibility is a binary search, in which a point is searched for by the division of input signal values by two, until a sufficient accuracy has been obtained. Though such a halving method would be suitable also for the final test, it is, however, not recommendable to use this method in the final test, but the final test is most preferably carried out by using the "ramp" method similar to the method described in FIG. 3, because big steps of change of the input quantity can cause overswing and a sufficient accuracy may not be obtained.

The method of defining an operating and a reset point for a limit value device according to the invention has been described above by means of only two exemplifying embodiments. It is, however, understandable that the procedures described above can be combined to some extent to different combinations, without differing from the scope of protection defined in the appended claims, however.

We claim:

1. A method of using calibration instrumentation for determining the operating and reset points for a device having an input and an output, the method comprising the steps of:

supplying a first variable input signal having a first rate of change to the input of the device;

detecting values of the first variable input during which the device changes state at the output of the device;

establishing areas from said values within which the device changes state at the output of the device;

supplying a second variable input signal having a second rate of change to the input of the device, the second input signal varying in the areas of said establishing step; and detecting values of the second variable input signal when the device changes state at the output of the device.

2. A method according to claim 1 wherein the first variable input signal is supplied at the first rate of change over a predetermined range of variation.

3. A method according to claim 1 wherein the first variable input signal is supplied at the first rate of change from a predetermined starting value until a change of state of the device is detected.

4. A method according to claim 1 wherein said supplying of said first variable input signal at said first rate of change, said detecting values of said first variable input signal and said establishing areas from said values further comprise the steps of:

a) changing the input signal stepwise over a first range of variation;

b) detecting the state of the device at the output of the device;

c) reducing the range of variation of the variable input signal;

d) changing the input signal stepwise over the reduced range of variation;

e) detecting the state of the device at the output of the device; and f) repeating steps c) to e) until ranges of variation are found within which the device changes state reliably, thereby determining value areas to be used when supplying the second variable input signal.

* * * * *